J. D. C. OUTWATER.
Disinfector.
No. 57,559.  Patented Aug. 28, 1866.
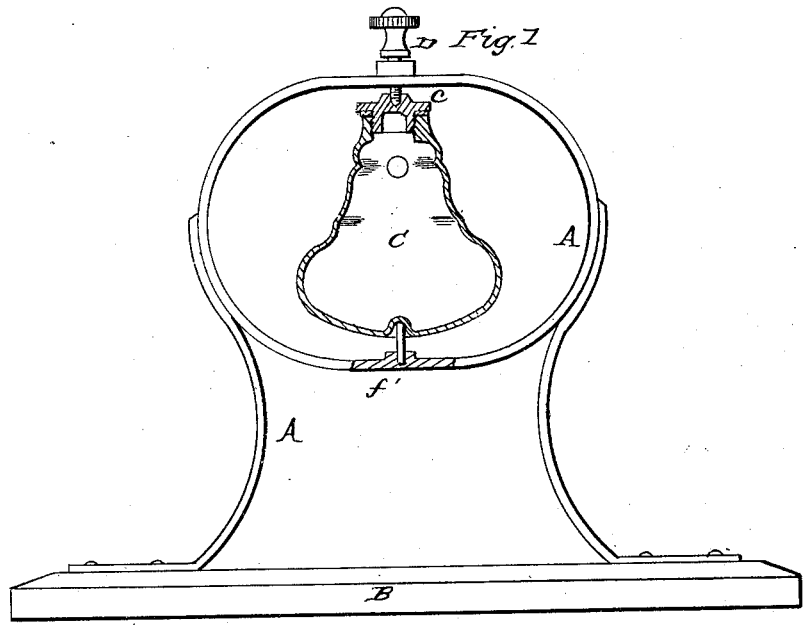
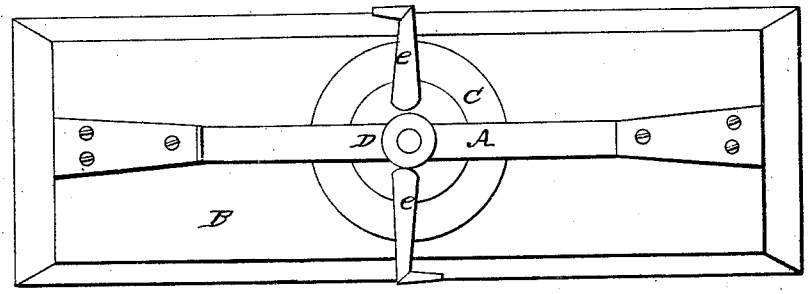
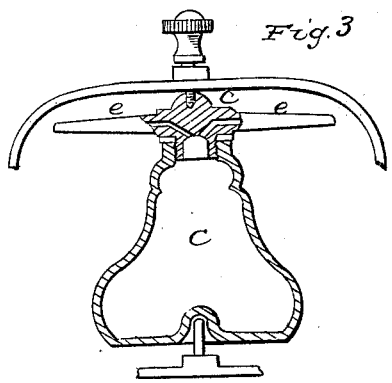
WITNESSES
F. A. Jackson
Wm Trewin
INVENTOR
J. D. C. Outwater
Per Munn & Co
Attorneys

UNITED STATES PATENT OFFICE.

J. D. C. OUTWATER, OF NEW YORK, N. Y.

IMPROVEMENT IN DISINFECTORS.

Specification forming part of Letters Patent No. 57,559, dated August 28, 1866.

*To all whom it may concern:*

Be it known that I, J. D. C. OUTWATER, of the city, county, and State of New York, have invented a new and Improved Disinfector; and I do hereby declare that the following is a full, clear, and exact description thereof, which will enable others skilled in the art to make and use the same, reference being had to the accompanying drawings, forming part of this specification, in which—

Figure 1 is a vertical section of my invention. Fig. 2 is a top view of the same; and Fig. 3 is a modification thereof.

Similar letters of reference indicate like parts.

This invention consists in a disinfecting-vessel of new and improved form, which is highly ornamental as well as useful, the vessel in general construction having the character of a revolving eolipile, as hereinafter explained.

C in the drawings is the glass vessel which holds the disinfecting-liquid, and it is supported in the frame A by two pivots or centers, D and *f*, Fig. 1. The frame A A is mounted on a small platform or wooden base, B. The liquid is placed in the vessel by unfastening the cap *c*, and then the vessel is adjusted in its frame A by placing the recessed bottom *x* of the glass vessel C upon the lower pivot or bearing, *f*, and then screwing down the adjustable or upper bearing, D, upon the india-rubber ring which is interposed between the glass and the cap.

The glass vessel C is provided at its top with two hollow arms, *e e*, Fig. 2, the terminations of which are bent in opposite directions, as shown, and the vessel C is rotated when in operation by the escape of vapor through these bent arms *e e*.

The vessel C is placed sufficiently high above the base B to make room for a heating-lamp below the vessel C, or other heating arrangement.

The vessel C being charged with any suitable disinfecting-liquid, and the lamp being applied, the liquid is soon brought to the boiling-point, and as the liquid is vaporized and disseminated the vessel C is revolved. In the same manner the device may be used for fumigating or perfuming apartments.

Fig. 3 (in red outline) shows the bent propelling-arms *e e* formed on the metal cap *c*. The body C of the vessel being made of glass, the quantity of liquid therein may be observed readily at any time.

Having thus described my invention, what I claim as new, and desire to secure by Letters Patent, is—

The combination of the glass vessel C, with a depression in its bottom, and a metal cap furnished with hollow arms, the whole being adapted to revolve in adjustable bearings in a frame, substantially as described and represented.

The above specification of my invention signed my me this 29th day of June, 1866.

J. D. C. OUTWATER.

Witnesses:
M. M. LIVINGSTON,
ALEX. F. ROBERTS.